United States Patent

Ohta et al.

[11] Patent Number: 5,979,759
[45] Date of Patent: Nov. 9, 1999

[54] IC CARD READER/WRITER AND ITS CONTROL METHOD

[75] Inventors: Michihiro Ohta, Sakado; Hiroaki Yoshida, Hatoyama-machi; Yoshiyuki Ohkuma, Tokyo, all of Japan

[73] Assignee: Kabushiki Kaisha Nippon Conlux, Tokyo, Japan

[21] Appl. No.: 09/011,235

[22] PCT Filed: Jun. 9, 1997

[86] PCT No.: PCT/JP97/01947

§ 371 Date: Feb. 6, 1998

§ 102(e) Date: Feb. 6, 1998

[87] PCT Pub. No.: WO97/48072

PCT Pub. Date: Dec. 18, 1997

[30] Foreign Application Priority Data

Jun. 10, 1996 [JP] Japan ................................... 8-147347

[51] Int. Cl.[6] ............................... G06K 7/06; G06K 7/00
[52] U.S. Cl. ......................... 235/441; 235/486; 235/487; 455/139
[58] Field of Search .................................... 235/492, 441, 235/486, 487, 475, 379; 902/22; 455/139, 141, 209, 255

[56] References Cited

U.S. PATENT DOCUMENTS

| 4,785,166 | 11/1988 | Kushima ................................. 235/441 |
|---|---|---|
| 4,990,760 | 2/1991 | Tomari et al. ........................... 235/492 |
| 5,206,495 | 4/1993 | Kreft ....................................... 235/492 |
| 5,812,942 | 9/1998 | Allen et al. .............................. 455/139 |
| 5,815,020 | 9/1998 | Allen et al. .............................. 327/255 |
| 5,917,168 | 6/1999 | Nakamura ............................... 235/379 |

FOREIGN PATENT DOCUMENTS

| 2135589 | 5/1990 | Japan . |
| 3044756 | 2/1991 | Japan . |
| 6325222 | 11/1994 | Japan . |

*Primary Examiner*—Thien Minh Le
*Attorney, Agent, or Firm*—Welsh & Katz, Ltd.

[57] ABSTRACT

The contact error of a contact section which is brought into contact with an IC card is detected reliably. The level of a reset signal which is supplied to a reset terminal (RST) of an integrated circuit (21) mounted on an IC card (20) through a contact section (11) is controlled to be low and also, the level of a clock signal which is supplied to a clock terminal (CLK) of the integrated circuit through the contact section is controlled to be low. After that, power for the integrated circuit (21) is supplied to a power supply terminal (Vcc) of the integrated circuit (21) through the contact section (11). At that time, the voltage which is outputted from an I/O terminal (I/O) of the integrated circuit (21) through the contact section (11) is compared with a predetermined reference level by a comparator (16). When the voltage is lower than the predetermined reference level, it is judged to be contact error of the contact section.

9 Claims, 2 Drawing Sheets

IC CARD READER/WRITER AND ITS CONTROL METHOD

TECHNICAL FIELD

The invention relates to an IC card reader/writer which reads data from and writes data to IC (integrated circuit) cards having integrated circuits mounted thereon; in particular, it relates to an IC card reader/writer having improved reliability which can reliably detect a contact error with respect to a contact section which is brought into contact with an integrated circuit mounted on an IC card at the time of reading data from and writing data to the IC card, and a method of controlling the same.

BACKGROUND ART

Recently, IC cards having integrated circuits mounted thereon have been devised for use as various types of cards such as bank cards etc. As these IC cards are able to store significantly more information than previous magnetic cards etc., they have the advantage of greatly increasing the types of usage possible.

However, with IC card reader/writers which read data from and write data to IC cards, when data is read from or written to the integrated circuit mounted on the IC card, this is carried out through the contact section which is brought into contact with integrated circuit terminals, and a problem therefore exists in terms of the possibility of poor contact, that is to say contact error, at the contact section.

In prior IC card reader/writers, in order to judge whether or not the contact section was in proper contact with the integrated circuit terminals, under conditions in which the contact section of the IC card reader/writer was in contact with the integrated circuit terminals of the IC card, IC card power was supplied to the IC card's integrated circuit power supply terminal from the IC card reader/writer, through the contact section; together with this, a clock signal was supplied to the IC card's integrated circuit clock terminal through the contact section; in addition, the IC card's integrated circuit reset terminal was set to a high level; thereafter, the data which was automatically outputted from the IC card's integrated circuit input/output terminal was read; and judgement was made as to whether the IC card reader/writer contact section was in proper contact with the IC card's integrated circuit terminals, according to whether or not the read-out data was the same as the expected data.

However, in the conventional IC card reader/writers described above, wherein a clock signal is supplied to the IC card's integrated circuit clock terminal, the IC card's integrated circuit reset terminal is set to a high level, and thereafter, judgement is made as to whether or not the contact section of the IC reader/writer is properly in contact with the IC card's integrated circuit terminals, according to whether or not the data automatically outputted from the IC card's integrated circuit input/output terminal is the same as the expected data, there has been a problem in so much as there are cases wherein, for example, even if contact with the IC card's integrated circuit power supply terminal is poor, signals supplied to other terminals of the IC card's integrated circuit flow within the IC card's integrated circuit and are used as power; in such cases, regardless of the fact that the contact section of the IC card reader/writer is not in proper contact with the IC card's integrated circuit terminals, data which is the same as the expected data is output from the input/output terminal of the IC card's integrated circuit; and based on this, the contact section of the IC card reader/writer is mistakenly determined to be in proper contact with the IC card's integrated circuit terminals.

In such cases, while power sufficient for reading data from the IC card's integrated circuit input/output terminal may have been supplied, this power is not sufficient for writing data through the IC card's integrated circuit input/output terminal and, where data write processing is carried out through the IC card's integrated circuit input/output terminal in this condition, write errors sometimes occur.

There has been a problem in that, in general, when write errors of this sort occur with respect to IC cards, the security data which is stored in the integrated circuit may be destroyed, and in this case, further use of the card becomes impossible.

An object of the present invention is to provide an IC card reader/writer and a method for controlling the same, wherein contact errors with respect to a contact section which is brought into contact with an integrated circuit mounted on an IC card are reliably detected, and whereby it is possible to carry out suitable processing before write errors with respect to the IC card occur.

DISCLOSURE OF THE INVENTION

In order to achieve the object described above, the present invention provides an IC card reader/writer having a contact section which is brought into contact with terminals of an integrated circuit mounted on an IC card, for reading data from and writing data to the integrated circuit through the contact section, characterized in that the IC card reader/writer comprises:

contact error detection means for controlling a reset signal supplied to a reset terminal of the integrated circuit through the contact section to a low level, for controlling a clock signal for the integrated circuit supplied to a clock terminal of the integrated circuit through the contact section to a low level, thereafter, for supplying power for the integrated circuit to a power supply terminal of the integrated circuit through the contact section and for detecting a contact error with respect to the contact section, when a voltage outputted from an input/output terminal of the integrated circuit through the contact section is lower than a predetermined reference voltage.

The contact error detection means may be configured such that, after the power for the integrated circuit has been supplied to the power supply terminal of the integrated circuit, it supplies the clock signal to the clock terminal of the integrated circuit for a predetermined period of time within which resetting of the integrate circuit is normally terminated and, thereafter, controls the clock signal again to the low level.

Furthermore, the IC card reader/writer comprises:

integrated circuit clock generation means for generating the clock signal for the integrated circuit; and integrated circuit power supply means for generating the power for the integrated circuit;

wherein the contact error detection means comprises:

first control means for controlling the reset signal supplied to the reset terminal of the integrated circuit through the contact section to the low level;

second control means for controlling the clock signal for the integrated circuit supplied to the clock terminal of the integrated circuit through the contact section to the low level, by controlling the integrated circuit clock signal generation means;

third control means for supplying the power for the integrated circuit to the power supply terminal of the integrated circuit through the contact section, by controlling the integrated circuit supply generation means; and comparison means for comparing the voltage outputted from the input/output terminal of the integrated circuit through the contact section with the predetermined reference voltage.

Furthermore, the IC card reader/writer may further comprise a central processor unit, wherein the first control means, the second control means and the third control means are realized by the central processor unit.

The configuration may be such that the comparison means is realized by the central processor unit.

Furthermore, the configuration may be such that, the clock signal generation means for the integrated circuit is also used as clock signal generation means for the central processor unit, which supplies the clock signal to the central processor unit.

Furthermore, the configuration may be such that, the power supply means for the integrated circuit is used as power supply means for the central processor unit, which supplies power to the central processor unit.

Furthermore, the present invention provides a method of controlling an IC card reader/writer having a contact section which is brought into contact with terminals of an integrated circuit mounted on an IC card, for reading data from and writing data to the integrated circuit through the contact section, characterized in that the method comprises:

a first step of controlling a reset signal supplied to a reset terminal of the integrated circuit through the contact section to a low level;

a second step of controlling a clock signal for the integrated circuit supplied to a clock terminal of the integrated circuit through the contact section to a low level, under a condition wherein the reset signal supplied to the reset terminal of the integrated circuit through the contact section is controlled to be the low level in the first step;

a third step of supplying power for the integrated circuit to a power supply terminal of the integrated circuit through the contact section, after controlling the clock signal for the integrated circuit supplied to the clock terminal of the integrated circuit through the contact section to the low level in the second step; and a fourth step of detecting a contact error with respect to the contact section, if a voltage outputted from an input/output terminal of the integrated circuit through the contact section is lower than a predetermined reference voltage when the power for the integrated circuit is supplied to the power supply terminal of the integrated circuit through the contact section in the third step.

The invention may be configured to further comprise:

a fifth step of supplying the clock signal to the clock terminal of the integrated circuit for a predetermined period of time within which resetting of the integrated circuit terminates normally, after supplying the power for the integrated circuit to the power supply terminal of the integrated circuit in the third step; and a sixth step of controlling the clock signal once again to the low level, after supplying the clock signal to the clock terminal of the integrated circuit in the fifth step.

With such configurations, a contact error with respect to a contact section which is brought into contact with an integrated circuit mounted on an IC card can be reliably detected, and it is possible to perform suitable processing before the occurrence of write errors with respect to the IC card.

BEST MODE FOR CARRYING OUT THE INVENTION

The following is a detailed explanation of one embodiment of the IC card reader/writer according to the present invention in accordance with the attached figures.

Figure 1:
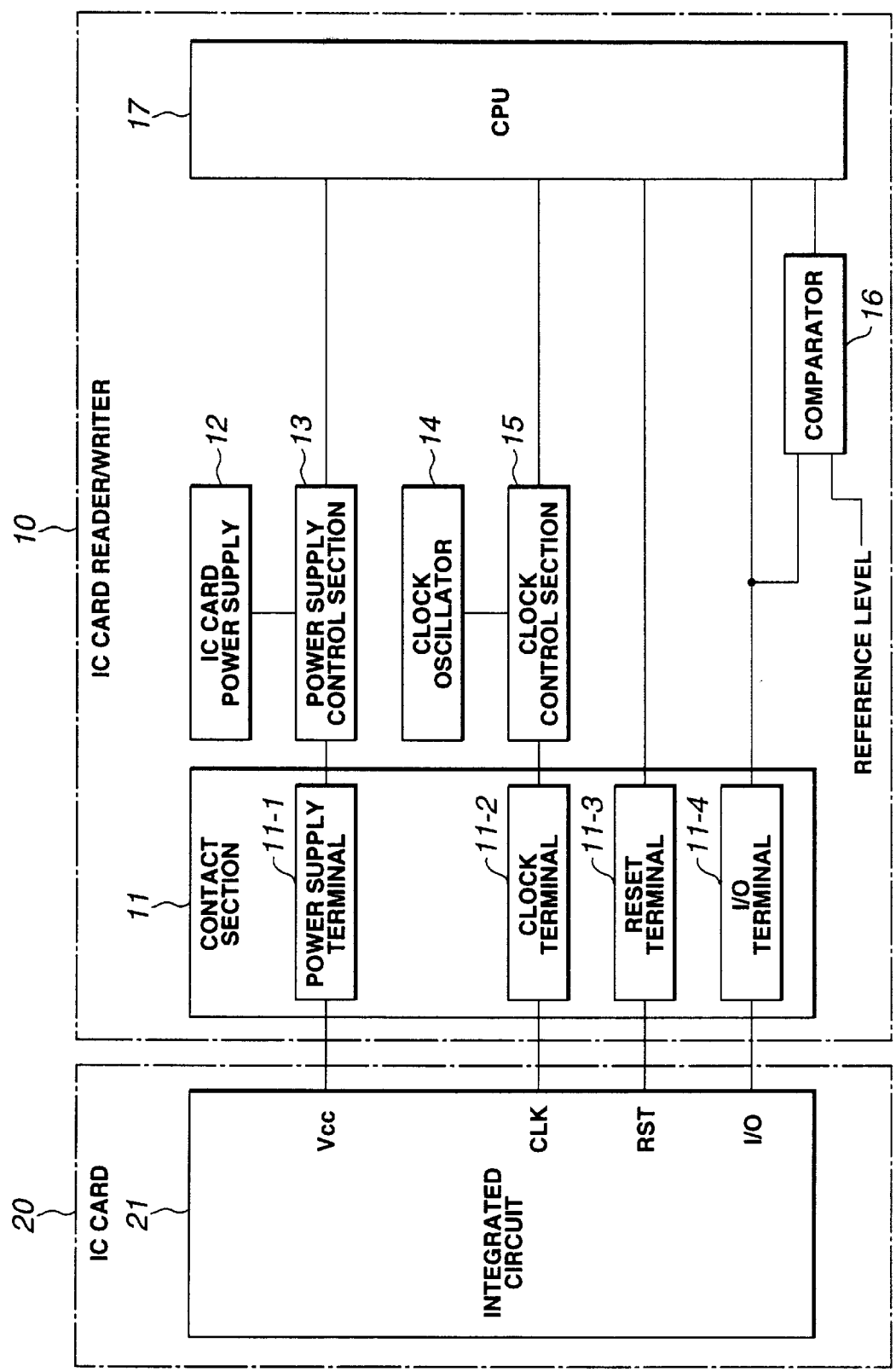
FIG. 1 is a block diagram showing the overall structure of an IC card reader/writer control system according to the present invention.

FIG. 1 is a block diagram showing the overall structure of the control system for IC card reader/writer 10 according to the present invention; as this IC card reader/writer 10 reads data from and writes data to integrated circuit 21, which is mounted on IC card 20, it is constructed so as to comprise: contact section 11 which is brought into contact with terminals of integrated circuit 21 of IC card 20; IC card power supply 12 which generates IC card power, which is supplied to power supply terminal Vcc of integrated circuit 21 through contact section 11; power supply control section 13 which controls the IC card power generated by IC card power supply 12; clock oscillator 14 which generates IC card clock which is supplied to clock terminal CLK of integrated circuit 21 through contact section 11; clock control section 15 which controls the clock generated by clock oscillator 14; comparator 16 which compares a signal generated by input/output terminal (I/O terminal) of integrated circuit 21 of IC card 20 and which is inputted through contact section 11 with a predetermined reference level; and central processor unit (CPU) 17 which controls power supply control section 13 and clock control section 15, and also: carries out processing which supplies a reset signal to the reset terminal RST of integrated circuit 21 through contact section 11; carries out processing which reads data from and writes data to the input/output terminal of integrated circuit 21 of IC card 20 through contact section 11; and carries out processing which detects a contact error with respect to contact section 11 based on the output of comparator 16, etc.

Furthermore, contact section 11 comprises: power supply terminal 11-1, clock terminal 11-2, reset terminal 11-3 and input/output terminal 11-4, which are brought into contact with, respectively, power supply terminal Vcc, clock terminal CLK, reset terminal RST and input/output terminal I/O of integrated circuit 21 of IC card 20.

Further, the IC card power supply 12 may be used as the IC card reader/writer 10 power supply.

Furthermore, the clock oscillator 14 may be used as the clock generator which supplies the CPU clock signal to the central processor unit (CPU) 17 of IC card reader/writer 10.

Furthermore, the comparator 16 may be configured with the use of the input section of such logical ICs as TTL, CMOS etc., which are installed within the central processor unit (CPU) 17 of IC card reader/writer 10.

The following is an outline of detection processing for errors in contact section 11 of IC card reader/writer 10 according to the aforementioned configuration.

1) By inserting IC card 20 into the IC card insertion slot (not shown in the diagram of IC card reader/writer 10), power supply terminal Vcc, clock terminal CLK, reset terminal RST, and input/output terminal I/O of integrated circuit 21 of IC card 20 are brought into contact with power supply terminal 11-1, clock terminal 11-2, reset terminal 11-3 and input/output terminal 11-4 of contact section 11 of IC card reader/writer 10.

2) The reset signal, which is supplied to reset terminal RST of integrated circuit 21 of IC card 20, is caused to be low-level by means of central processor unit (CPU) 17 of IC card reader/writer 10.

3) Clock control section 15 is controlled by means of central processor unit (CPU) 17 of IC card reader/writer 10 and, thereby, the clock signal which is supplied to clock terminal CLK of integrated circuit 21 of IC card 20 is caused to be low-level.

4) Power supply control section 13 is controlled by means of central processor unit (CPU) 17 of IC card reader/writer 10 and, thereby, IC card power which is generated by IC card power supply 12 is supplied to power supply terminal Vcc of integrated circuit 21 of IC card 20.

5) A clock signal is supplied to clock terminal CLK of the integrated circuit 21 for a period of time within which resetting of integrated circuit 21 of IC card 20 terminates normally and, thereafter, the clock signal is controlled so as to be low-level once again.

6) The voltage generated at the input/output terminal (I/O terminal) of integrated circuit 21 of IC card 20 is compared with a predetermined reference level by comparator 16 of IC card reader/writer 10.

7) In cases where the comparison result of comparator 16 indicates that the voltage generated by the input/output terminal (I/O terminal) of integrated circuit 21 of IC card 20 is lower than a predetermined reference level, central processor unit (CPU) 17 of IC card reader/writer 10 judges that a contact error has occurred for contact section 11.

The reason for providing the processing expressed in 5), that is, in other words, processing wherein, after power has been supplied to power supply terminal Vcc of 20 integrated circuit 21 of IC card 20, a clock signal is supplied to clock terminal CLK for a period of time within which resetting of integrated circuit 21 of IC card 20 terminates normally and, thereafter, the clock signal is controlled so as to be low-level once again, is to make reliable detection of contact errors with respect to the contact section possible, even in cases where integrated circuit 21 mounted on IC card 20 is such a type of integrated circuit that causing the rest signal which is supplied to reset terminal RST to be low level, causing the clock signal which is supplied to clock terminal CLK to be low level and, thereafter, supplying power to power supply terminal Vcc alone does not result in a stable condition.

In other words, depending on the type of integrated circuit 21 mounted on IC card 20, causing the rest signal which is supplied to set terminal RST to be low level, causing the clock signal which is supplied to clock terminal CLK to be low level and, thereafter, supplying power to power supply terminal Vcc alone may not result in a stable condition for the integrated circuit 21 mounted on IC card 20.

So as to allow for this, the present embodiment is so structured that, after supplying power to power supply terminal Vcc of integrated circuit 21 of IC card 20, a clock signal is supplied to the clock terminal CLK for a predetermined period of time, thereby waiting for the normal termination of the resetting of the integrated circuit 21, and thereafter, the clock signal which is supplied to clock terminal CLK of the integrated circuit 21 is once again controlled so as to be low-level.

Further, in cases where the integrated circuit 21 mounted on IC card 20 is of such a type that causing the rest signal which is supplied to reset terminal RST to be low level, causing the clock signal which is supplied to clock terminal CLK to be low level, and thereafter, supplying power to power supply terminal Vcc alone results in a stable condition, the processing expressed in the aforementioned 5) is not necessary.

Furthermore, in cases where the comparison result of comparator 16 indicates that the voltage generated at the input/output terminal (I/O terminal) of integrated circuit 21 of IC card 20 is greater than a specified reference level, contact section 11 of IC card reader/writer 10 may be considered to be in proper contact with the various terminals of integrated circuit 21 of IC card 20 and, therefore, central processor unit (CPU) 17 of IC card reader/writer 10 controls clock control section 15 so that: the IC card clock generated by clock oscillator 14 is supplied to clock terminal CLK of integrated circuit 21 of IC card 20; the reset signal which is supplied to reset terminal RST is caused to be high-level; the data which is automatically output from the input/output terminal (I/O terminal) of integrated circuit 21 of IC card 20 is, as a result of this, read; and checking is carried out in the same way as previously, so as to verify whether or not this data is the same as the expected data.

Figure 2:
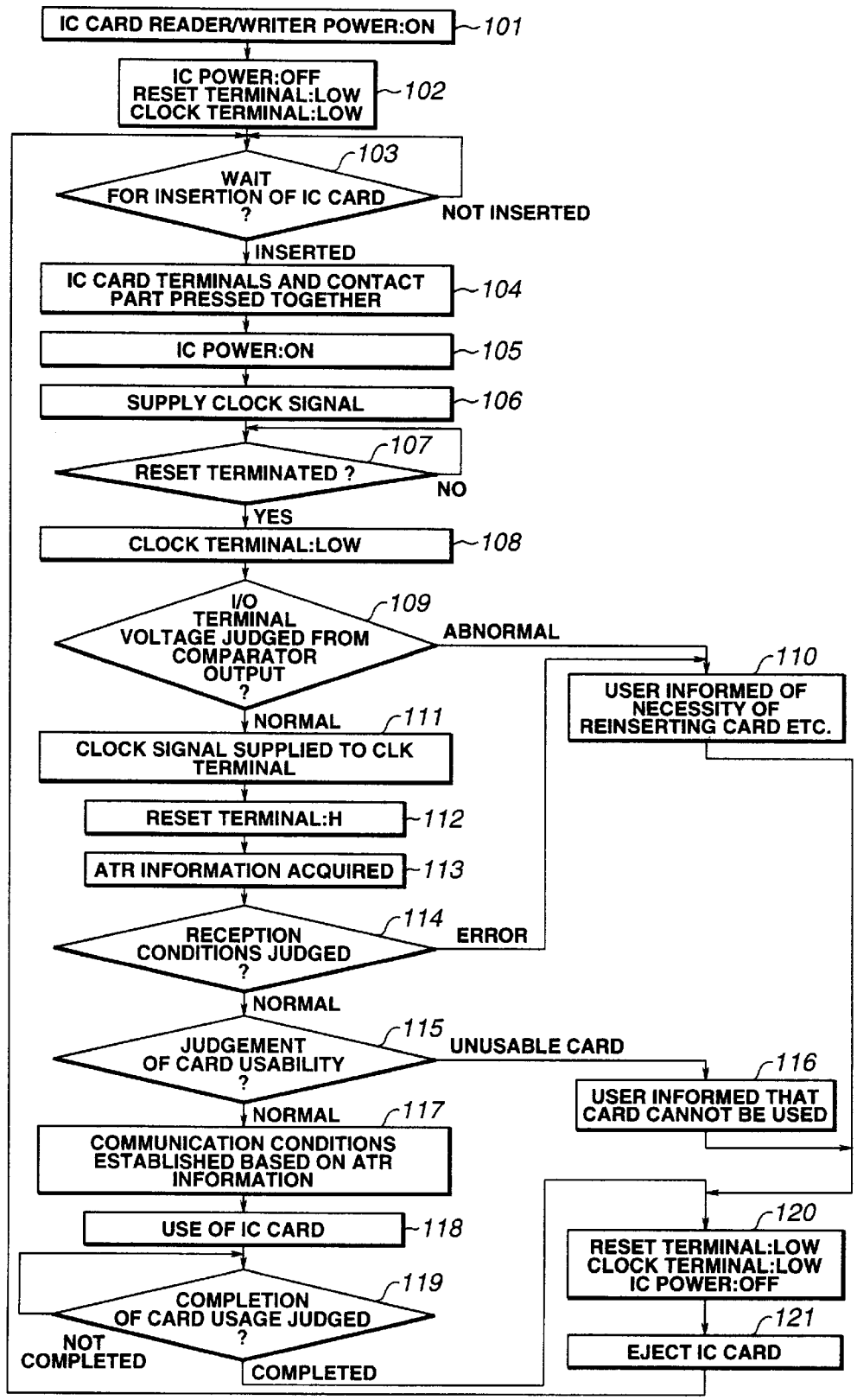
FIG. 2 is a flow chart showing the processing details for the IC card reader/writer shown in FIG. 1.

FIG. 2 shows details of the aforementioned processing which detects contact errors with respect to contact section 11 in IC card reader/writer 10, in the form of a flow chart.

According to FIG. 2, the power supply (not shown in the diagram of IC card reader/writer 10) is first turned ON (step 101). Following this, power supply control section 13 is controlled so that the IC power is OFF, the reset signal which is supplied to reset terminal RST of integrated circuit 21 of IC card 20 is caused to be low-level and the clock signal which is supplied to clock terminal CLK of the same is caused to be low level (step 102).

Next, the system waits for the insertion of IC card 20 (step 103); when IC card 20 is inserted, by virtue of pressing together the terminal section of IC card 20 and contact section 11, contact is made between the various terminals of IC card 20 and contact section 11 (step 104). Further, in cases where IC card reader/writer 10 is constructed so that the terminal section of IC card 20 and contact section 11 are automatically pressed together when IC card 20 is inserted, the processing in this step (104) is not necessary.

Next, power supply control section 13 is controlled so that IC power is turned ON (step 105); a clock signal is supplied to clock terminal CLK (step 106); and normal termination of resetting is verified (step 107). Thereupon, in cases where resetting has terminated normally (YES for step 107), the clock signal which is supplied to clock terminal CLK is once again caused to be low-level (step 108).

Next, the voltage at input/output terminal (I/O terminal) of integrated circuit 21 of IC card 20 is judged by means of comparator 16 (step 109). In other words, the voltage at the input/output terminal (I/O terminal) of integrated circuit 21 of IC card 20 is compared with a predetermined reference level.

In the case of abnormalities, in other words, in cases where the voltage at the input/output terminal (I/O terminal) of integrated circuit 21 of IC card 20 is less than a predetermined reference level, contact section 11 of IC card reader/writer 10 is not properly in contact with the various terminal of integrated circuit 21 of IC card 20 and, therefore, the user is informed of the fact that IC card 20 must be reinserted (step 110).

In this case, reset terminal RST of integrated circuit 21 of IC card 20 is set to a low level, clock terminal CLK is set to a low level and IC card power is turned OFF (step 120); IC card 20 is ejected (step 121) and step 103 is returned to.

Further, the configuration may be such that, in step 110, instead of informing the user of the fact that IC card 20 must be reinserted, IC card 20 is automatically reinserted and another attempt is made.

Furthermore, if the result of step 109 is normal, in other words, in cases where the voltage at the input/output terminal (I/O terminal) of integrated circuit 21 of IC card 20 is greater than a predetermined reference level: clock control section 15 is controlled so that a clock signal is supplied to clock terminal CLK of integrated circuit 21 of IC card 20 (step 111); the reset signal supplied to reset terminal RST is caused to be high level (step 112); and the ATR information from the input/output terminal (I/O terminal) of integrated circuit 21 of IC card 20 is acquired (step 113).

Thereupon reception conditions are judged from this ATR information (step 114).

In cases where an error has occurred: step 110 is proceeded to; the user is informed of the fact that IC card 20 must be reinserted; reset terminal RST of integrated circuit 21 of IC card 20 is set to a low level; clock terminal CLK is set to a low level; IC card power is turned OFF (step 120); IC card 20 is ejected (step 121); and step 103 is returned to.

Further, in step 121, instead of ejecting IC card 20, the configuration may be such that withdrawal of the IC card is made possible, or such that the user is informed of the fact that IC card 20 can be removed.

In cases where no errors occur in step 114, judgement is next made as to whether the inserted IC card 20 is a usable card or not (step 115).

In cases where IC card 20 is judged not to be a usable card, the user is informed that this card cannot be used (step 116); thereafter: reset terminal RST of integrated circuit 21 of IC card 20 is set to a low level; clock terminal CLK is set to a low level; the IC power is turned OFF (step 120); IC card 20 is ejected (step 121); and step 103 is returned to.

Furthermore, in step 115, if the inserted IC card 20 is normal, in other words, in cases where it is judged to be a usable card, communication conditions are established based on the ATR information acquired from the input/output terminal (I/O terminal) of integrated circuit 21 of IC card 20 (step 117); and use is made of this card by reading data from or writing data to it (step 118).

Next, judgement is made as to whether usage of this IC card 20 has been completed (step 119). If it is judged that usage of 20 has been completed, reset terminal RST of the integrated circuit 21 of IC card 20 is set to a low level; clock terminal CLK is set to a low level; the IC power is turned OFF (step 120); IC card 20 is ejected (step 121); and step 103 is returned to.

By virtue of a configuration such as this, contact errors with respect to contact sections which are brought into contact with integrated circuits mounted on IC cards are reliably detected, and it is possible to carry out suitable processing before the occurrence of write errors with respect to IC cards.

Industrial Applicability

The present invention provides, an IC card reader/writer wherein contact errors with respect to contact sections which are brought into contact with integrated circuits mounted on IC cards are reliably detected, and wherein it is possible to carry out suitable processing before the occurrence of write errors with respect to IC cards, and a method of controlling the same are provided. A reset signal which is supplied to the reset terminal of an integrated circuit mounted on an IC card through a contact section is controlled so as to be low-level; together with this, an integrated circuit clock signal which is supplied to an integrated circuit clock terminal through a contact section is controlled so as to be low-level; integrated circuit power is thereafter supplied to an integrated circuit power supply terminal through a contact section; at this time, the voltage which is output from the integrated circuit input/output terminal through the contact section is compared with a predetermined reference level by means of a comparator; and, in cases where the voltage at the input/output terminal is less than a predetermined reference level, a contact error is detected with respect to the contact section.

We claim:

1. An IC card reader/writer having a contact section which is brought into contact with terminals of an integrated circuit mounted on an IC card, for reading data from and writing data to the integrated circuit through the contact section, characterized in that the IC card reader/writer comprises:

contact error detection means for controlling a reset signal supplied to a reset terminal of the integrated circuit through the contact section to a low level, for controlling a clock signal for the integrated circuit supplied to a clock terminal of the integrated circuit through the contact section to a low level, thereafter, for supplying power for the integrated circuit to a power supply terminal of the integrated circuit through the contact section and for detecting a contact error with respect to the contact section, when a voltage outputted from an input/output terminal of the integrated circuit through the contact section is lower than a predetermined reference voltage.

2. An IC card reader/writer according to claim 1 wherein, the contact error detection means, after the power for the integrated circuit has been supplied to the power supply terminal of the integrated circuit, supplies the clock signal to the clock terminal of the integrated circuit for a predetermined period of time within which resetting of the integrate circuit is normally terminated and, thereafter, controls the clock signal again to the low level.

3. An IC card reader/writer according to claim 1 further comprising:

integrated circuit clock generation means for generating the clock signal for the integrated circuit; and integrated circuit power supply means for generating the power for the integrated circuit;

wherein the contact error detection means comprises:

first control means for controlling the reset signal supplied to the reset terminal of the integrated circuit through the contact section to the low level;

second control means for controlling the clock signal for the integrated circuit supplied to the clock terminal of the integrated circuit through the contact section to the low level, by controlling the integrated circuit clock signal generation means;

third control means for supplying the power for the integrated circuit to the power supply terminal of the integrated circuit through the contact section, by controlling the integrated circuit supply generation means; and comparison means for comparing the voltage outputted from the input/output terminal of the integrated circuit through the contact section with the predetermined reference voltage.

4. An IC card reader/writer according to claim 1, further comprising a central processor unit, wherein the first control means, the second control means and the third control means are realized by the central processor unit.

5. An IC card reader/writer according to claim 3, further comprising a central processor unit, wherein the comparison means is realized by the central processor unit.

6. An IC card reader/writer according to claim 3, further comprising a central processor unit, wherein the clock signal generations means for the integrated circuit is also used as clock signal generation means for the central processor unit, which supplies the clock signal to the central processor unit.

7. An IC card reader/writer according to claim 3, further comprising a central processor unit, wherein the power supply means for the integrated circuit is used as power supply means for the central processor unit, which supplies power to the central processor unit.

8. A method of controlling an IC card reader/writer having a contact section which is brought into contact with terminals of an integrated circuit mounted on an IC card, for reading data from and writing data to the integrated circuit through the contact section, characterized in that the method comprises:

a first step of controlling a reset signal supplied to a reset terminal of the integrated circuit through the contact section to a low level;

a second step of controlling a clock signal for the integrated circuit supplied to a clock terminal of the integrated circuit through the contact section to a low level, under a condition wherein the reset signal supplied to the reset terminal of the integrated circuit through the contact section is controlled to be the low level in the first step;

a third step of supplying power for the integrated circuit to a power supply terminal of the integrated circuit through the contact section, after controlling the clock signal for the integrated circuit supplied to the clock terminal of the integrated circuit through the contact section to the low level in the second step; and a fourth step of detecting a contact error with respect to the contact section, if a voltage outputted from an input/output terminal of the integrated circuit through the contact section is lower than a predetermined reference voltage when the power for the integrated circuit is supplied to the power supply terminal of the integrated circuit through the contact section in the third step.

9. A method of controlling an IC Card reader/writer according to claim 8, further comprising:

a fifth step of supplying the clock signal to the clock terminal of the integrated circuit for a predetermined period of time within which resetting of the integrated circuit terminates normally, after supplying the power for the integrated circuit to the power supply terminal of the integrated circuit in the third step; and a sixth step of controlling the clock signal once again to the low level, after supplying the clock signal to the clock terminal of the integrated circuit in the fifth step.

* * * * *